United States Patent
Su

(10) Patent No.: US 10,079,703 B1
(45) Date of Patent: Sep. 18, 2018

(54) USE OF AN ECHO SIGNAL IN SYNCHRONIZATION OF MULTIPLE SIGNAL COLLECTIONS FROM MULTIPLE SENSORS

(71) Applicant: The United States of America, as represented by the Secretary of the Army, Washington, DC (US)

(72) Inventor: Wei Su, Bel Air, MD (US)

(73) Assignee: The United States of America, as represented by the Secretary of the Army, Washington, DC (US)

(*) Notice: Subject to any disclaimer, the term of this patent is extended or adjusted under 35 U.S.C. 154(b) by 1482 days.

(21) Appl. No.: 13/782,069

(22) Filed: Mar. 1, 2013

(51) Int. Cl.
*H04L 27/00* (2006.01)
*H04L 1/00* (2006.01)

(52) U.S. Cl.
CPC ........ *H04L 27/0012* (2013.01); *H04L 1/0009* (2013.01)

(58) Field of Classification Search
None
See application file for complete search history.

(56) References Cited

U.S. PATENT DOCUMENTS

| 8,085,882 | B1 | 12/2011 | Su | |
|---|---|---|---|---|
| 8,326,240 | B1* | 12/2012 | Kadambe | H04B 1/70735 455/114.2 |
| 8,917,802 | B1* | 12/2014 | Su | H04L 27/0012 375/343 |

OTHER PUBLICATIONS

Su et al., "Framework of Network Centric Signal Sensing for Automatic Modulation Classification," 2010 IEEE International Conference on Networking, Sensing and Control, Chicago, IL. Apr. 2010.

Xu, et al., "Distributed Automatic Modulation Classification with Multiple Sensors." IEEE Sensors Journal, vol. 10, Issue: 11, Nov. 2010, pp. 1779-1785.

Xu, et al., "Asynchronous and High Accuracy Digital Modulated Signal Detection by Sensor Networks," MILCOM 2011, Baltimore, MD, Nov. 2011.

Zhang, et al., "Optimal Decision Fusion based Automatic Modulation Classification by using Wireless Sensor Networks in Multipath Fading Channel," IEEE GlobeCom 2011, Huston, TX, Dec. 2011.

(Continued)

*Primary Examiner* — Willie J Daniel, Jr.
(74) *Attorney, Agent, or Firm* — Ronald Krosky; Azza Jayaprakash

(57) ABSTRACT

Various embodiments associated with use of an echo signal are described. A plurality of sensors can be deployed to obtain editions of a signal of interest. The signal of interest may be so far away from the sensors that the editions collected are too noisy to be analyzed. A processing center can send an echo signal to the sensors and the sensors can respond to the processing center with a signal edition of the signal of interest and the echo signal. Since the processing center knows information about the echo signal, offsets among the sensors can be calculated based on the returned echo signals. These offsets can then be used to align the signal editions. At the processing center, the aligned signal editions can be combined into a combined signal and a demodulation scheme for the combined signal can be determined and then used for demodulation of the signal.

20 Claims, 14 Drawing Sheets

(56) References Cited

OTHER PUBLICATIONS

Zhang, et al., "Multi-sensor Signal Fusion based Modulation Classification by using Wireless Sensor Networks in AWGN Channel," IEEE International Conference on Communications, Kyoto, Japan, Jun. 2011.
Su, et al., "Dual-use of Modulation Recognition Techniques for Digital Communication Signals," in Proc. IEEE LISAT, Long Island, NY, May 2006, pp. 1-6.

* cited by examiner

USE OF AN ECHO SIGNAL IN SYNCHRONIZATION OF MULTIPLE SIGNAL COLLECTIONS FROM MULTIPLE SENSORS

GOVERNMENT INTEREST

The innovation described herein may be manufactured, used, imported, sold, and licensed by or for the Government of the United States of America without the payment of any royalty thereon or therefor.

BACKGROUND

In a combat environment, different forces can broadcast different signals. In a singular environment, enemy combatants can each broadcast different signals. It may be possible for one combatant to intercept the signal of another combatant. The intercepting combatant may not know the modulation scheme of an intercepted signal. Without the modulation scheme, it may be difficult to put the intercepted signal to use.

SUMMARY

A system comprising an emission component, a collection component, and a non-transitory computer-readable medium is described. The emission component is configured to cause an emission of an echo signal to a first sensor and a second sensor, where the first sensor and the second sensor are different sensors. The collection component is configured to collect a first edition of the echo signal with a first edition of a signal of interest from the first sensor and configured to collect a second edition of the echo signal with a second edition of the signal of interest from the second sensor. The first edition of the echo signal, the first edition of the signal of interest, the second edition of the echo signal, and the second edition of the signal of interest are used to select a demodulation scheme for the signal of interest. The non-transitory computer-readable medium is configured to retain at least one instruction associated with the emission component or the collection component In addition, a system is described comprising an offset component that performs a calculation of an echo signal offset, where the echo signal offset is calculated through comparison of a first edition of the echo signal against a second edition of the echo signal, where the first edition of the echo signal is collected with a first edition of a signal of interest from a first sensor, where the second edition of the echo signal is collected with a second edition of the signal of interest from a second sensor, where a network of the signal of interest is unknown, where the first edition of the signal of interest and the second edition of the signal of interest are not identical, and where the first sensor and second sensor are different sensors. The system also comprises a compensation component that performs a compensation for the second edition of the signal of interest through use of the echo signal offset. The system further comprises a processor that executes at least one instruction associated with the offset component or the compensation component.

Moreover, a non-transitory computer-readable medium is also described that is configured to store computer-executable instructions that when executed by a processor cause the processor to perform a method. The method comprises causing an emission of an echo signal to a first sensor and of the echo signal to a second sensor, where the first sensor and the second sensor are different sensors. The method also comprises collecting a first edition of an echo signal with a first edition of a signal of interest from the first sensor, where a network of the signal of interest is unknown. The method additionally comprises collecting a second edition of the echo signal with a second edition of the signal of interest from the second sensor, where a network of the signal of interest is unknown, where the first edition of the signal of interest and the second edition of the signal of interest are not identical. The method also comprises separating the first edition of the echo signal from the first edition of the signal of interest. In addition, the method comprises separating the second edition of the echo signal from the second edition of the signal of interest. Further, the method comprises calculating an offset of the first edition of the echo signal against the second edition of the echo signal. The method additionally comprises modifying the second edition of the signal of interest through use of the offset to produce a modified second edition of the signal of interest. The method also comprises combining the first edition of the signal of interest and the modified second edition of the signal of interest to produce a combined signal of the signal of interest.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Asynchronous low-cost sensors can be employed in distributed locations for sensing and classifying a very weak signal. This weak signal may not be identifiable through use of a single sensor alone (e.g., due to the weak nature of the signal), but can be detected and classified by fusing multiple weak signal copies together, where the signal copies (e.g., editions) are collected by a sensor network. These signal copies, which are asynchronous due to the sensors being asynchronous, can have relative offsets in both frequency and phase due to the diversities and drifts in the distributed local oscillators. A synchronization method can be employed to estimate the relative offsets by transmitting an echo signal to the asynchronous sensors. The returning echo signal copies which have been contaminated by local oscillators can be used for estimating the relative offsets. The weak signal is compensated by using the estimated offsets of the echo signal and coherently combined to achieve a higher processing gain for reliable signal exploitation.

A central decision (e.g., at a fusion center) based distributed signal sensing method can employ simple, inexpensive, low-maintenance, and heterogeneous sensors so sensing devices can be deployed to cover a wide spread geographical area seamlessly and multiple narrow-band receivers can be collaborated to handle a wide frequency band effectively. The distributed sensors can be clustered and orchestrated by the fusion center which has sufficient processing power to process the signal copies. The fusion center can periodically send a requesting signal (RS) to L distributed sensors, $R_1$, $R_2$, ..., and $R_L$ to acquire a signal of interest (SOI) that is weak. Upon the reception of the request, the distributed sensors take short time duration snapshots of the SOI. The distributed sensors may provide very limited signal processing capabilities such as radio frequency reception and transmission, frequency tuning and down-conversion, filtering, and digitization. Thus, sensors may be asynchronous and non-cooperative to one another and may be used for communicating with, or relaying distributed snapshots to, the fusion center. If the frequency down-conversion local oscillators (LOs) are all different due to heterogeneous and asynchronous characteristics, the fusion center can be configured to estimate and compensate the relative frequency offset (RFO) and the relative phase offset (RPO) induced by different LOs at the distributed locations before combining the signal copies coherently. However, if the SOI is very weak (e.g., below 0 dB Signal-to-Noise Ratio (SNR)), the offset estimation may become unreliable. To compensate for this, a method can be employed to estimate RFO and RPO by using an echo signal (ES) transmitted by the fusion center and then fed back by the distributed sensors.

Figure 1:
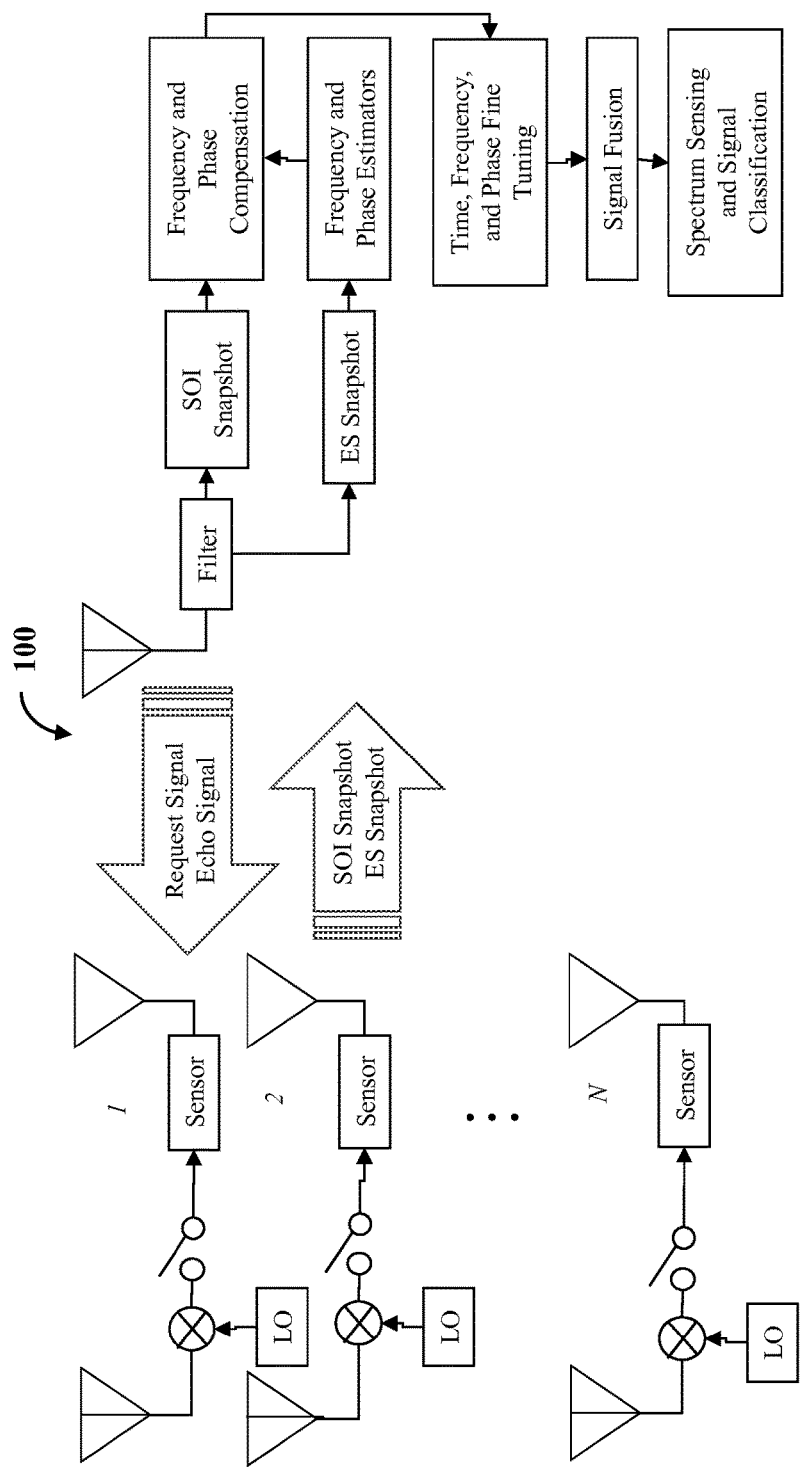
FIG. 1 illustrates one embodiment of a system comprising sensors and a fusion center.

FIG. 1 illustrates one embodiment of sensors (with LOs) and a fusion center (comprising a filter module, SOI Snapshot module, ES Snapshot module, a frequency and phase compensation module, a frequency and phase estimators module, time, frequency, and phase fine tuning module, signal fusion module, and spectrum sensing and signal classification module), shown in combination as a system 100. When the SOI is transmitted with low-power or in a remote location (e.g., the SOI is transmitted from a ship or in a space vehicle and the sensors are along the shore or in an isolated geographical area or when the sensors are in unfavorable or noisy receiving locations), the SOI copies collected at distributed sensors may be too weak to analyze. In a dumb sensor and smart fusion center scenario, the sensors are asynchronous and the fusion center combines the signal copies after a post-synchronization process. When the asynchronous signal copies are very weak, the post-synchronization becomes very difficult and unreliable. Therefore, an ES is transmitted by the fusion center to the sensors together with the RS for collecting SOI. The ES can be transmitted in the same frequency as the SOI, or RS, or in different frequencies. The RS itself can serve as the ES in that one signal is transmitted by the fusion center. The sensors may or may not be configured to make local decisions and store the short snapshots, $r_i(t)$, i=1, 2, . . . , L, as time-stamped data packets and forward them to the fusion center for processing. The packets can be transmitted to the fusion center using a communication method. Without loss of generality, $R_1$ is assumed to be the reference sensor, $R_2$, $R_3$, . . . , and $R_L$ are compared to $R_1$ for calculating offsets (e.g, the offset of $R_2$ is based on a difference of $R_2$ from $R_1$). A signal packet received at the fusion center can include an SOI copy and an ES copy described by $$r_i(t)=\Delta\alpha_i e^{j(\Delta\omega_i t+\Delta\beta_i)}[s(t+\Delta\tau_i)+s_E(t+\Delta\tau_{E,i})]+n_i \quad (1)$$

where $\Delta\omega_i$ and $\Delta\beta_i$ are RFO and RPO induced by LOs, $\Delta\tau_i$ is the relative time offset (RTO), $\Delta\tau_{E,i}$ is the relative time offset associated with ES, and $\Delta\alpha_i$ is the relative magnitude offset (RMO) which does not need to be known. When i=1, $\Delta\omega_1=\Delta\beta_1=\Delta\tau_1=\Delta\tau_{E,1}=0$. Relative offsets are referring to $$r_1(t)=s(t)+s_E(t)+n_1(t) \quad (2)$$

where $s(t)=a_0 s_0(t+\tau_0)e^{j(\omega_0 t++\beta_0)}$ and $s_E(t)$ are the frequency down-converted copies of the SOI and ES, respectively, observed at $R_1$, $s_0(t)$ is a sequence of pulse shaped information symbols, $\alpha_0$, $\omega_0$, $\beta_0$, $\tau_0$ are gain, frequency, phase, and time offsets between the SOI and $R_1$, respectively, and $n_i\sim\mathcal{N}(0,\sigma_i)$ is i.i.d. circularly symmetric complex additive white Gaussian noise (AWGN). When periodical short snapshots of SOI are used, there may be ample time between two snapshots for signal processing and analysis. When AWGN channels are used (as well as possibly other channels), aspects disclosed herein can be conducted in real-time.

The fusion center can comprise an antenna, a Relative Sampling-frequency Offset (RSO) Estimator and Resampler, an ES and SOI Splitter, registers for ES copies and SOI copies, and estimators and compensators for RFO and RPO. The SOI and ES copies received at the fusion center are sent to the FSO estimator and resampler to correct the sampling offset such that the samples from different signal copies will be lined up in time for further processing. The symbol rate of the SOI can be used as a reference for estimating RSO and the signal copies with RSOs can be interpreted and re-sampled after RSO estimation. The splitter separates a received signal copy, $r_i$, to an ES copy, $r_{E,i}(t)=\Delta\alpha_i e^{j(\Delta\omega_i t+\Delta\beta_i)}$ $s_E(t+\Delta\tau_{E,i})$, and an SOI copy, $r_{S,i}(t) = \Delta\alpha_i e^{j(\Delta\omega_i t + \Delta\beta_i)} s(t+\Delta\tau_i)$, for i=1, 2, . . . , L. The ES copies are stored in ES-copy registers and SOI copies are stored in SOI-copy registers for signal processing.

The ES copies from L sensors are sent to the Relative Frequency and Phase Estimator for estimating the RFO and RTO induced by LOs. The ES can be designed to be relatively short and strong, be an easily separated and synchronized signal which can be as simple as a tone, be a repeated known code, etc. The estimates of RFO and RPO can be obtained by taking the fast Fourier transform (FFT) of $$q(t) = r_{E,1}*(t) r_{E,i}(t - \Delta\hat{\tau}_{E,i}) \quad (3)$$

where the RFO estimate $\Delta\hat{\omega}_i$ can found by searching a maximum FFT magnitude in the frequency domain within a searching window, the RPO estimate $\Delta\hat{\beta}_i$ is the phase of FFT at $\Delta\hat{\omega}_i$, and $\Delta\hat{\tau}_{E,i}$ is an estimate of $\Delta_{E,i}$ found by maximizing)

$$\chi(\Delta\hat{\tau}_{E,i}) = \int_{t \in T_0} r_{E,1}*(t) r_{E,1}(t) r_{E,i}*(t-\Delta\hat{\tau}_{E,i}) r_{E,i}(t-\Delta\hat{\tau}_{E,i}) dt \quad (4)$$

Assuming the RFO and RPO of LOs are not changed in the short observation time period, the estimates $\Delta\hat{\omega}_i$ and $\Delta\hat{\beta}_i$ can be used to compensate the RFO and RPO of SOI copies in the Relative Frequency and Phase Compensator as shown below $$\eta_i(t) = e^{-j(\Delta\hat{\omega}_i + \Delta\hat{\beta}_i)} r_{S,i}(t) = \Delta a_i e^{j(\Delta\omega_i - \Delta\hat{\omega}_i)t + \Delta\beta_i - \Delta\hat{\beta}_i} s(t+\Delta\tau_i) + n_i(t) \quad (5)$$

$$\approx \Delta a_i s(t+\Delta\tau_i) + n_i(t)$$

Under the scenario in which the SOI is far away for the sensors, the RTOs of SOI copies can be relatively small and have little impact to the coherent combining of the SOI copies. In the case where the RTO should be compensated, RTO can be estimated by searching the best $\hat{\tau}_i$ using a Relative Time Estimator and Compensator such that $$\chi(\Delta\hat{\tau}_{S,i}) = \left\| \int_{t \in T_0} \eta_1^*(t) \eta_i(t - \Delta\hat{\tau}_i) dt \right\| \quad (6)$$

is a maximum within the searching window $T_0$. The L copies of SOI collected in the distributed locations are combined coherently at the SOI Copies Combiner as shown below:

$$r^c(t) = \sum_{i=1}^{L} e^{-j\Delta\hat{\omega}_i(t_i - \Delta\hat{\tau}_i) + \Delta\hat{\beta}_i} r_{S,i}(t - \Delta\hat{\tau}_i) + n^c(t) \quad (7)$$

to form a more accurate estimation of the SOI for exploitation. Where $n^c(t)$ is the combined noise diminishing with a large L. Selection can occur on what signal copies are combined. For example, one can choose to combine copies with a higher SNRs or less channel distortion. In another example, one can stop combining when the SNR of the combined signal exceeds a threshold. The estimation of the offsets can be calculated use parallel processing. The combined signal can be used for the signal sensing, classification, and localization.

The fusion center can be designed to have the sufficient computational power and bandwidth to handle and process the signal copies provided by sensors in a short amount of time. ES and SOI registers (ES Copy 1 to ES Copy L and SOI Copy 1 to SOI Copy L that can be part of the fusion center) can be memories or storage devices (e.g., a non-transitory computer-readable medium). Estimators, compensators, and a combiner can be signal processors (such as a processor). When the channel is not AWGN, the channel phases can be added to the signal snapshots observed in the distributed locations and the additional RPO estimation can be be applied or an adaptive filter will be used to compensate the channel phase.

Aspects disclosed herein can be used for detecting remote weak signals from outer space, receiving low power transmission signals, demodulate cell phone signal transmitted at a location far away from towers, military or police surveillance of hostile transmission, spectrum survey of weak signals, and other applications.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

A plurality of sensors can be deployed in an environment to obtain editions a signal of interest. However, the sensors may be so far away from the signal of interest that the editions are difficult to use. Therefore, an echo signal can be sent to the plurality of sensors and the sensors can respond with the signal edition and the echo signal. Since the processing center knows information about the echo signal, an offset can be calculated among returned echo signals. This offset can then be used to align the signal editions. Once aligned, the signal editions can be combined into a combined signal that represents the signal of interest. A demodulation scheme for the combined signal can be determined and the signal can be demodulated according to the demodulation scheme.

Figure 2:
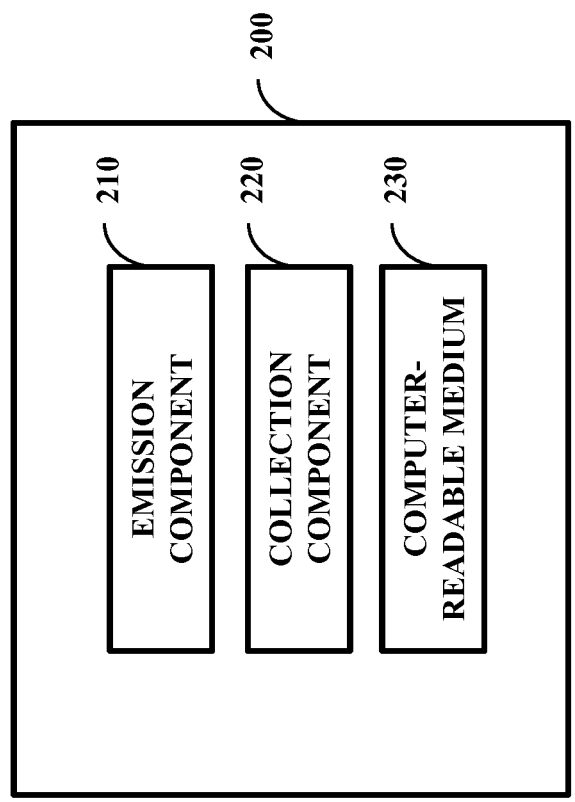
FIG. 2 illustrates one embodiment of a system comprising an emission component, a collection component, and a computer-readable medium.

FIG. 2 illustrates one embodiment of a system 200 comprising an emission component 210, a collection component 220, and a computer-readable medium 230. The emission component 210 is configured to cause an emission of an echo signal to a first sensor and a second sensor, where the first sensor and the second sensor are different sensors. The collection component 220 is configured to collect a first edition of the echo signal with a first edition of a signal of interest (e.g., the echo signal edition and signal of interest edition integrated together) from the first sensor. The collection component 220 is also configured to collect a second edition of the echo signal with a second edition of the signal of interest from the second sensor. The first edition of the echo signal, the first edition of the signal of interest, the second edition of the echo signal, and the second edition of the signal of interest are used to select a demodulation scheme for the signal of interest. The computer-readable medium 230 (e.g., non-transitory computer-readable medium) is configured to retain at least one instruction associated with the emission component or the collection component.

In one embodiment, the first sensor is part of a first electronic device with a primary purpose other than functioning as a sensor of the first edition of the signal of interest (e.g., a walkie-talkie radio) and the second sensor is part of a second electronic device with a primary purpose other than functioning as a sensor of the second edition of the signal of interest (e.g., another walkie-talkie radio, a different model or brand of walkie-talkie radio, a tunable software-defined radio, etc.). The first electronic device and the second device are different personal electronic devices.

Thus, sensors can be part of already existent equipment. For example, various electronic devices can be carried by soldiers in the battlefield. These electronic devices can be employed as sensors (e.g., when they are not being used for their primary purpose). The devices can send signal editions to a command center far away from the battlefield and the editions can be processed.

In one embodiment, the emission component 210 is configured to cause emission of the echo signal with a signal of interest request signal (e.g., a separate signal of interest request signal or the echo signal functions as the signal of interest request signal) to the first sensor and the second sensor. The first sensor sends the first edition of the echo signal with the first edition of a signal of interest that is collected by the collection component 220 in response to the signal of interest request signal. In addition, the second sensor sends the second edition of the echo signal with the second edition of a signal of interest that is collected by the collection component 220 in response to the signal of interest request signal.

Figure 3:
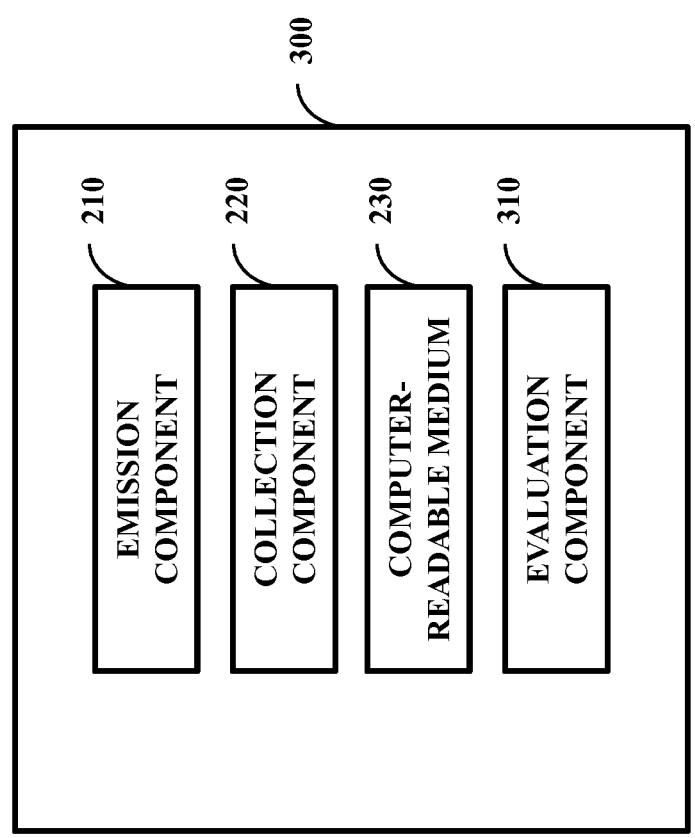
FIG. 3 illustrates one embodiment of a system comprising the emission component, the collection component, the computer-readable medium, and an evaluation component.

FIG. 3 illustrates one embodiment of a system 300 comprising the emission component 210, the collection component 220, the computer-readable medium 230, and an evaluation component 310. The evaluation component 310 is configured to perform a first evaluation of the first edition of the signal of interest to determine if the first edition of the signal of interest is of sufficient strength as well as configured to perform a second evaluation of the second edition of the signal of interest to determine if the second edition of the signal of interest is of sufficient strength.

In one embodiment, editions of the signal of interest can be collected by the collection component 220 without the echo signal. These editions can be evaluated by the evaluation component 310 and a determination can be made that the editions are too weak to process. The evaluation component 310 can then cause the emission component 210 to send the echo signal to the sensors requesting that the signal of interest be returned with an edition of the echo signal. When the sensors comply, the echo signal can be used to better understand network diversity and perform processing on the signal of interest editions. If the evaluation component 310 makes a determination that the editions are strong enough to process, then processing can occur without use of the echo signal.

Figure 4:
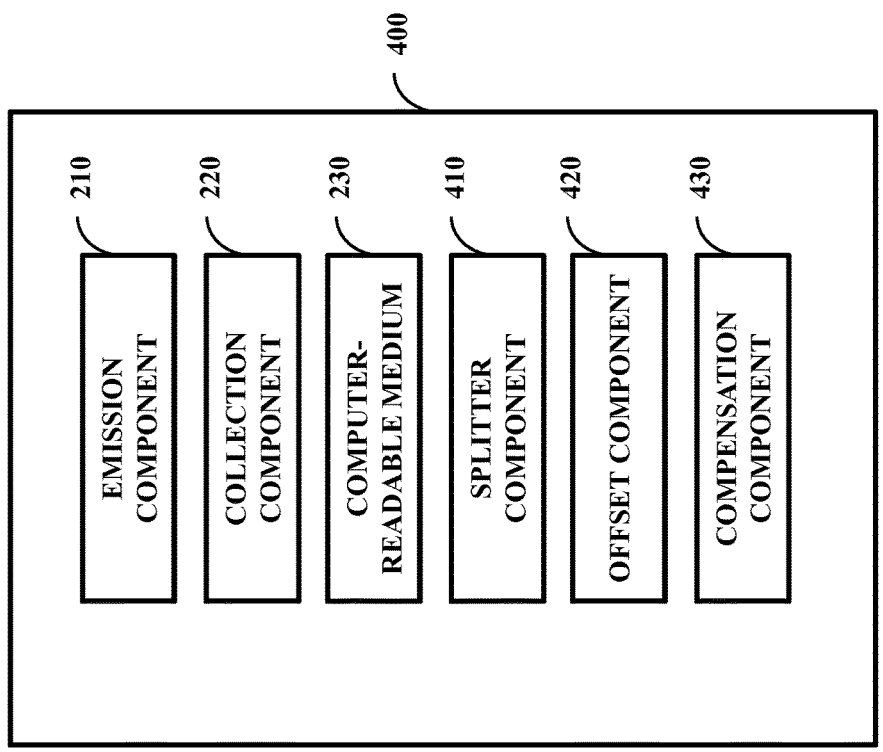
FIG. 4 illustrates one embodiment of a system comprising the emission component, the collection component, the computer-readable medium, a splitter component, an offset component, and a compensation component.

FIG. 4 illustrates one embodiment of a system 400 comprising the emission component 210, the collection component 220, the computer-readable medium 230, a splitter component 410, an offset component 420, and a compensation component 430. The splitter component 410 is configured to separate the first edition of the echo signal from the first edition of the signal of interest and configured to separate the second edition of the echo signal from the second edition of the signal of interest. The offset component 420 is configured to perform a calculation of an echo signal offset, where the echo signal offset is calculated through use of the first edition of the echo signal and the second edition of the echo signal. The compensation component 430 is configured to perform a compensation for an offset of the first edition of the signal of interest against the second edition of signal of interest through use of the echo signal offset.

The collection component 220 can collect from the individual sensors a combined communication that includes an edition of the echo signal (e.g., an edition influenced by factors of the sensor, such as a frequency and phase offsets related to the sensor) and an edition of the signal of interest (e.g., with the same influence as that of the echo signal). The splitter component 410 can separate the echo signal editions from the signal of interest editions. The offset component 420 can then calculate an offset between the first edition of the echo signal and the second edition of the echo signal. While a network of the signal of interest may not be known and thus information may not be known about signal of interest. However, since the echo signal can be considered known to the network, then information is known about the echo signal. For example, even if the signal edition is weak, the original echo signal is known so greater information can be ascertained. An offset for the echo signal can be calculated, such as a difference between the first edition of the echo signal and the second edition of the echo signal. Since a difference between the first edition of the echo signal and the second edition of the echo signal should be the same as a difference between the first edition of the signal of interest and the second edition of the signal of interest, the offset can be applied to the editions of the signal of interest. Therefore, the compensation component can modify one of the editions of the signal of interest to align with another of the editions of the signal of interest. With the editions of the signal of interest aligned, processing and combination can occur.

In one embodiment, the calculation of the echo signal offset comprises calculation of a relative frequency offset and calculation of a relative phase offset. This can be in addition to some other offset calculation. In one embodiment, the calculation comprises a fast Fourier transform.

Figure 5:
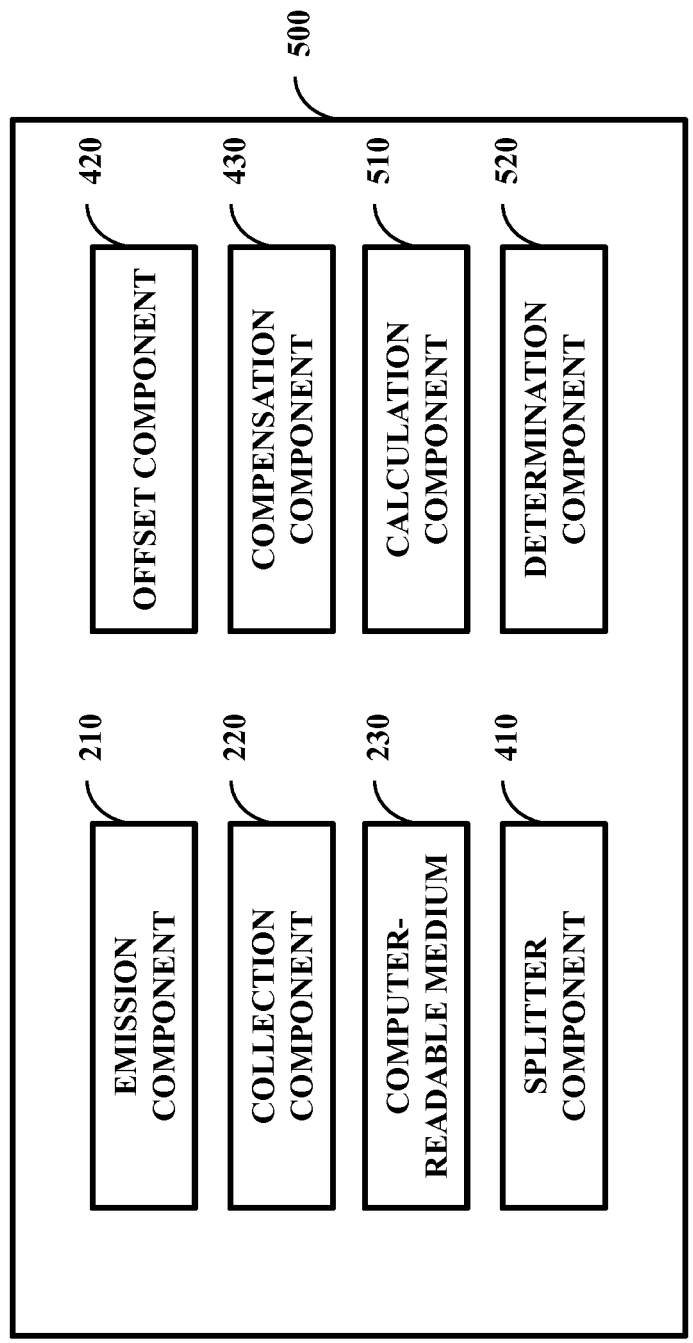
FIG. 5 illustrates one embodiment of a system comprising the emission component, the collection component, the computer-readable medium, the splitter component, the offset component, the compensation component, a calculation component, and a determination component.

FIG. 5 illustrates one embodiment of a system 500 comprising the emission component 210, the collection component 220, the computer-readable medium 230, the splitter component 410, the offset component 420, the compensation component 430, a calculation component 510, and a determination component 520. The calculation component 510 is configured to perform a mathematical operation (e.g., taking a moment of the editions of the signal of interest, taking a cumulant of the editions of the signal of interest, etc.) upon the first edition of the signal of interest after compensation and upon the second edition of the signal of interest after compensation to produce a mathematical result. Performance of the mathematical operation eliminates uncorrelated noise of the first edition of the signal of interest and the second edition of the signal of interest. The determination component 520 is configured to make a determination on a modulation scheme for the signal of interest based, at least in part, on the mathematical result, where the modulation scheme is employed to demodulate the signal of interest.

In one embodiment, the editions of the signal of interest may include noise. Since noise is random, exact noise in one edition should not be present in another edition. A mathematical operation can be performed upon the editions (e.g., editions before combination) that eliminate the uncorrelated noise, which can be done since the noise is random. The editions of the signal of interest can then be combined and/or be subjected to processing.

Figure 6:
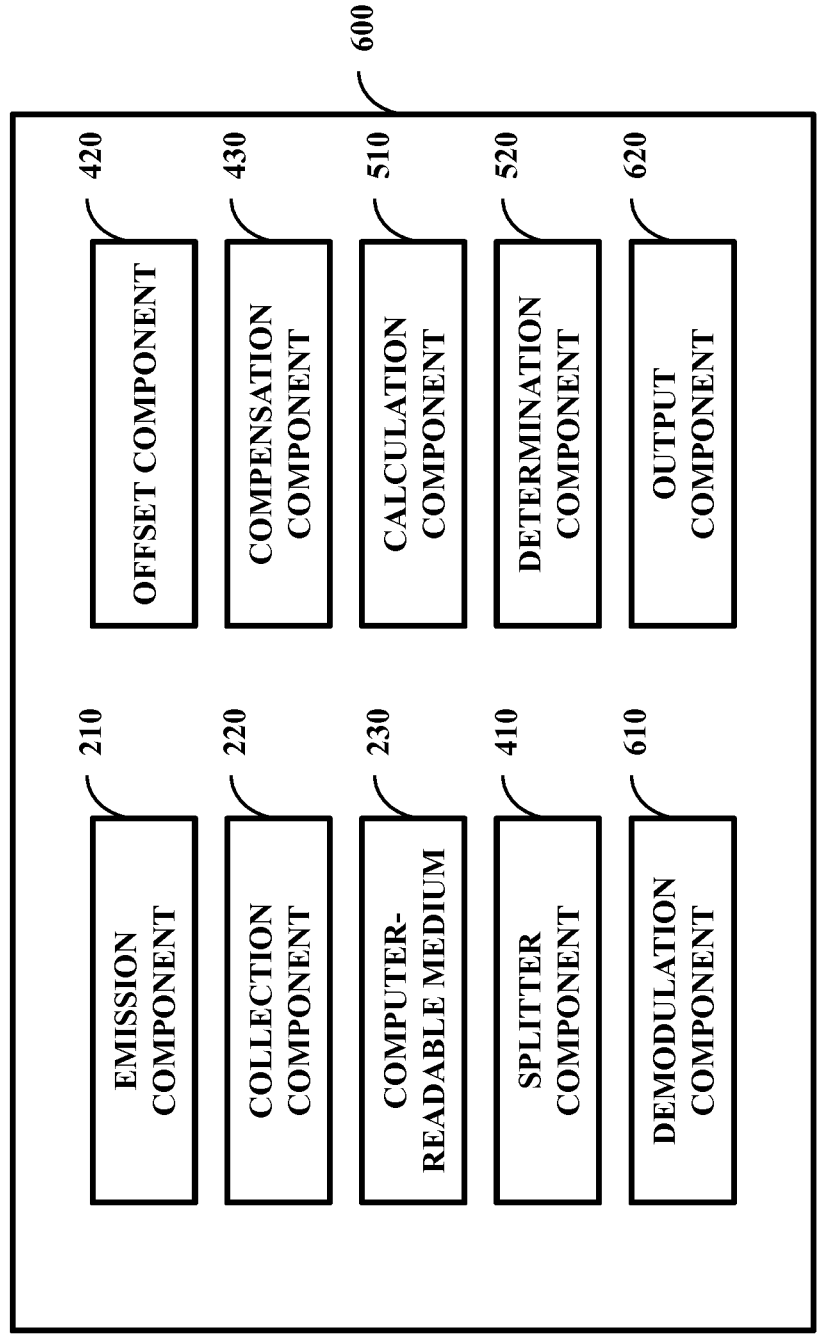
FIG. 6 illustrates one embodiment of a system comprising the emission component, the collection component, the computer-readable medium, the splitter component, a demodulation component, the offset component, the compensation component, the calculation component, the determination component, and an output component.

FIG. 6 illustrates one embodiment of a system 600 comprising the emission component 210, the collection component 220, the computer-readable medium 230, the splitter component 410, a demodulation component 610, the offset component 420, the compensation component 430, the calculation component 510, the determination component 520, and an output component 620. The demodulation component 610 is configured to demodulate the signal of interest through employment of the modulation scheme. The output component 620 is configured to cause the signal of interest to be outputted (e.g., transfer to a location, made available, etc.) after being demodulated.

Figure 7:
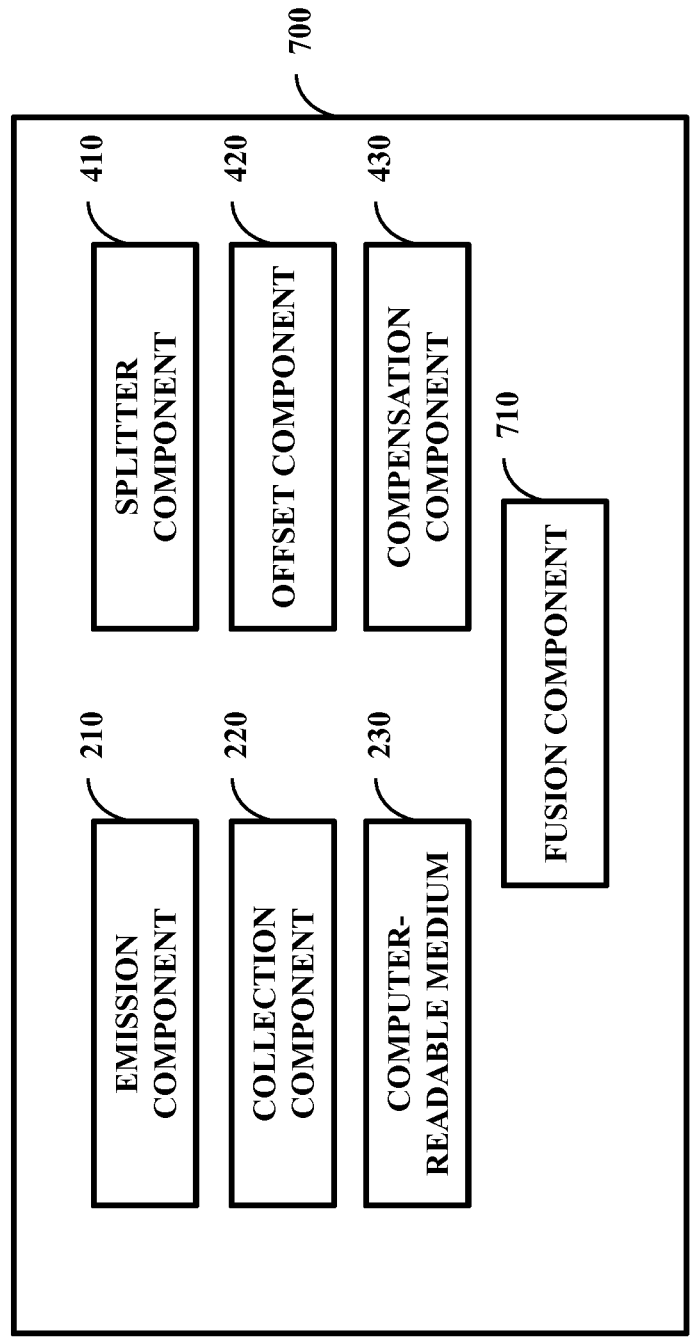
FIG. 7 illustrates one embodiment of a system comprising the emission component, the collection component, the computer-readable medium, the splitter component, the offset component, the compensation component, and a fusion component.

FIG. 7 illustrates one embodiment of a system 700 comprising the emission component 210, the collection component 220, the computer-readable medium 230, the splitter component 410, the offset component 420, the compensation component 430, and a fusion component 710. The fusion component 710 is configured to produce a combined signal through combination of the first edition of the signal of interest with the second edition of the signal of interest. This production occurs after the first edition of the signal of interest is separated from the first edition of the echo signal and after the second edition of the signal of interest is separated from the second edition of the echo signal. The combined signal can be used in signal sensing, classification, and localization.

Figure 8:
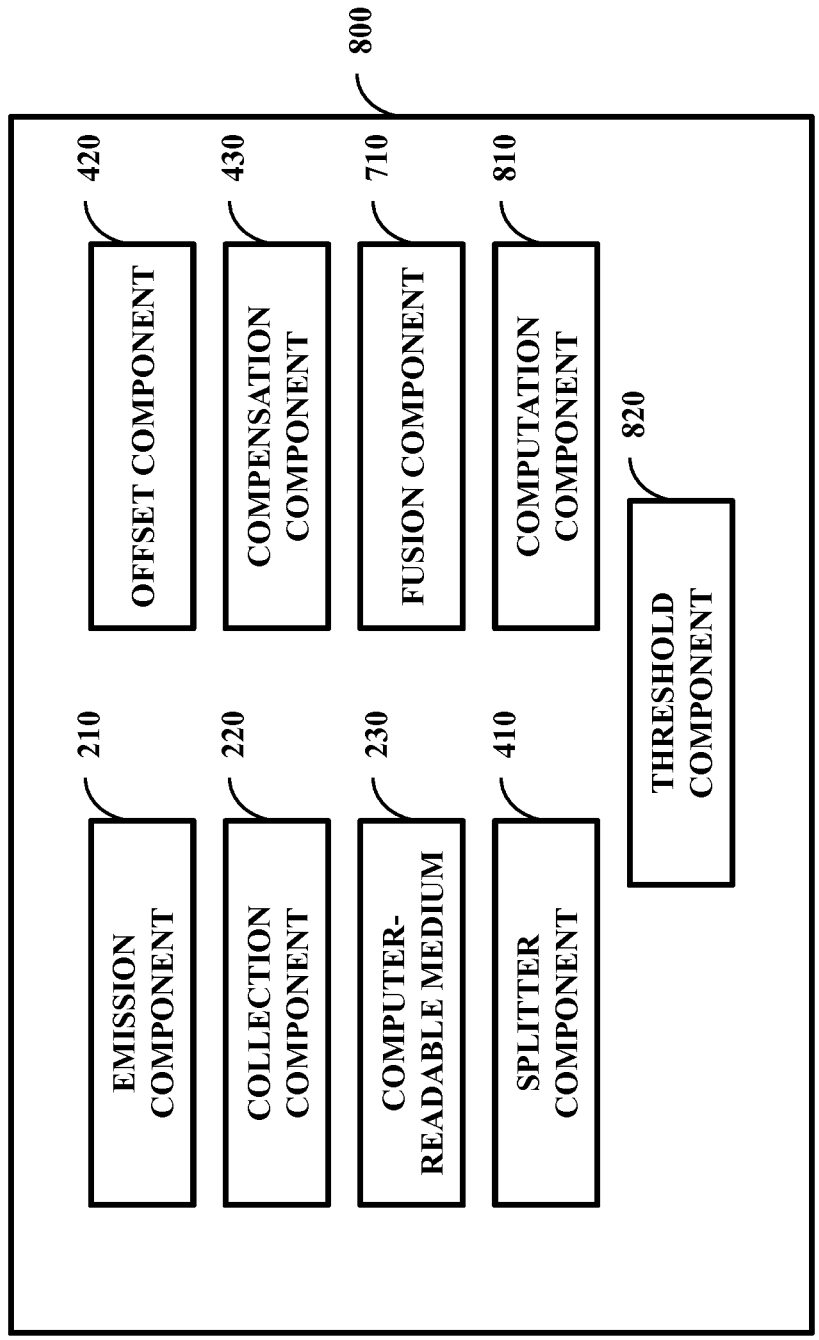
FIG. 8 illustrates one embodiment of a system comprising the emission component, the collection component, the computer-readable medium, the splitter component, the offset component, the compensation component, the fusion component, a computation component, and a threshold component.

FIG. 8 illustrates one embodiment of a system 800 comprising the emission component 210, the collection component 220, the computer-readable medium 230, the splitter component 410, the offset component 420, the compensation component 430, the fusion component 710, a computation component 810, and a threshold component 820. A third edition of the echo signal with a third edition of the signal of interest can be collected by the collection component 220 from a third sensor. The splitter component 410 separates the third edition of the echo signal from the third edition of the signal of interest. The third edition of the signal edition is added to the combined signal to increase the fusing gain.

While aspects disclosed herein address two sensors with two signal editions (e.g., echo and signal of interest), it is to be appreciated by one of ordinary skill in the art that more than two sensors and more than two signal editions may be employed. In one example, five editions can be collected from five different sensors. In one embodiment, the fusion component 710 can fuse the five signals together. In one embodiment, the fusion component can fuse two of the five signal versions together into a combined signal. A third edition can be added to the combined signal. This can continue until there are no more signal editions that can be combined into the combined signal.

Figure 9:
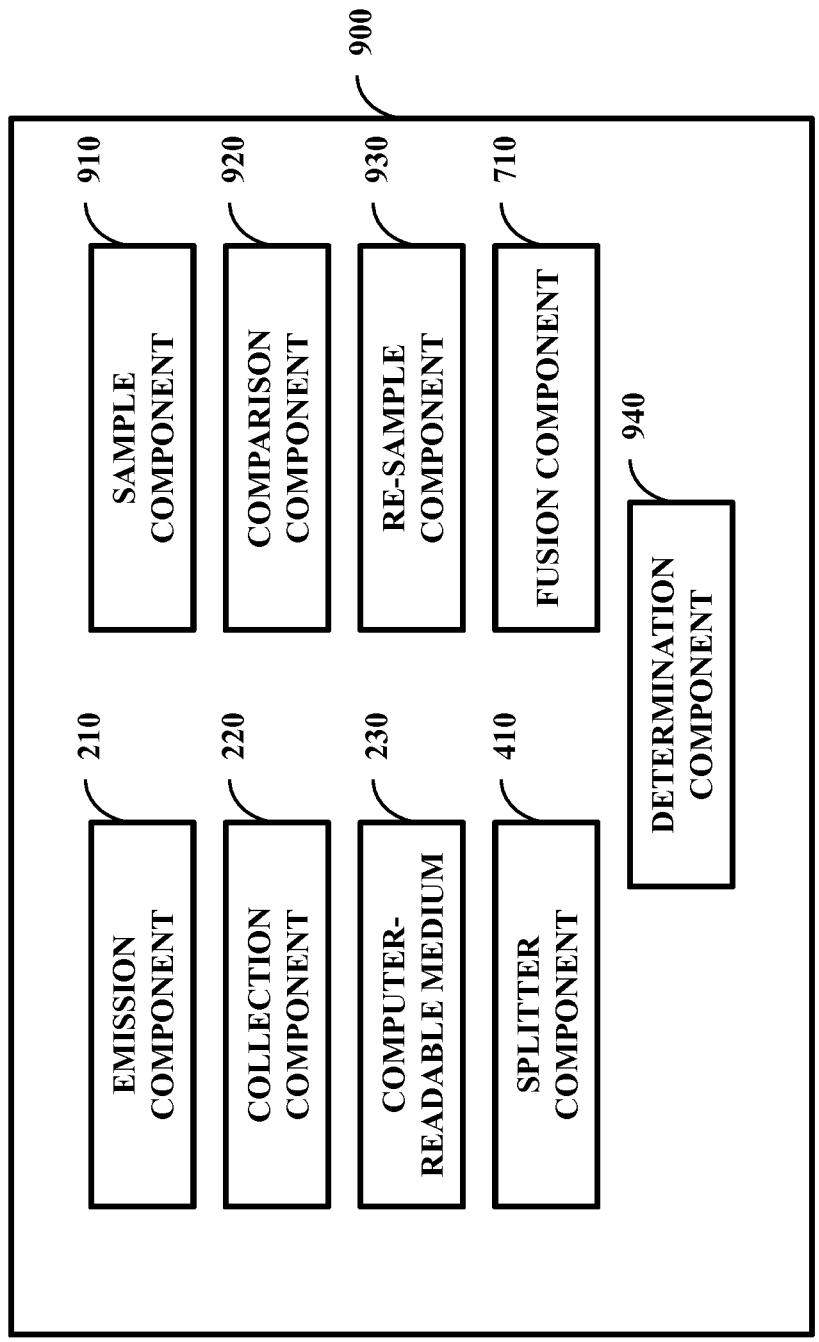
FIG. 9 illustrates one embodiment of a system comprising the emission component, the collection component, the computer-readable medium, the splitter component, a sample component, a comparison component, a re-sample component, the fusion component, and a determination component.

FIG. 9 illustrates one embodiment of a system 900 comprising the emission component 210, the collection component 220, the computer-readable medium 230, the splitter component 410, a sample component 910, a comparison component 920, a re-sample component 930, the fusion component 710, and a determination component 940. The splitter component 410 is configured to separate the first edition of the echo signal from the first edition of the signal of interest and is configured to separate the second edition of the echo signal from the second edition of the signal of interest. The sample component 910 is configured to determine a sample status of the second edition of the signal of interest after the second edition of the signal of interest is separated from the second edition of the echo signal. The comparison component 920 is configured to make a first threshold determination if the sample status of the second edition of the signal of interest is at the acceptable level. The re-sample component 930 is configured to re-sample the second edition of the signal of interest to a re-sampled second edition of the signal of interest if the second threshold determination is that the sample status of the second edition of the signal of interest is not at the acceptable level. The re-sampled second edition of the signal of interest is lined up in time with the first edition of the signal of interest. The fusion component 710 is configured to produce a combined signal through combination of one of: the first edition of the signal of interest with the second edition of the signal of interest or the first edition of the signal of interest with the re-sampled second edition of the signal of interest. The determination component 940 is configured to make a determination on a modulation scheme for the signal of interest based, at least in part, on the combined signal.

Figure 10:
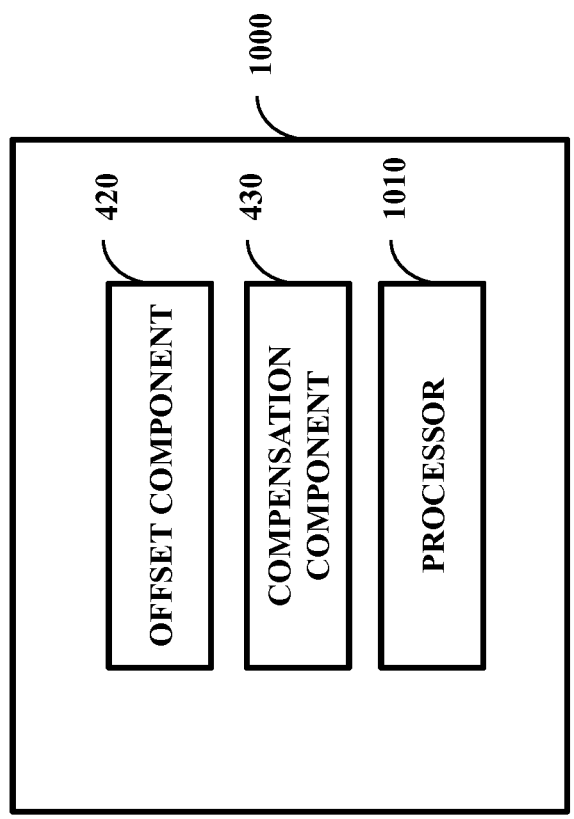
FIG. 10 illustrates one embodiment of a system comprising the offset component, the compensation component, and a processor.

FIG. 10 illustrates one embodiment of a system 1000 comprising the offset component 420, the compensation component 430, and a processor 1010. The offset component 420 performs a calculation of an echo signal offset, where the echo signal offset is calculated through comparison of a first edition of the echo signal against a second edition of the echo signal, where the first edition of the echo signal is collected with a first edition of a signal of interest from a first sensor, where the second edition of the echo signal is collected with a second edition of the signal of interest from a second sensor, where a network of the signal of interest is unknown, where the first edition of the signal of interest and the second edition of the signal of interest are not identical, and where the first sensor and second sensor are different sensors The compensation component 430 performs a compensation for the second edition of the signal of interest through use of the echo signal offset. The processor 1010 executes at least one instruction associated with the offset component 420 or the compensation component 430 (e.g., the offset component 420, the compensation component 430, the offset component 420 and the compensation component 430, the offset component 420 and another component, the compensation component 430 and another component, the offset component 420 and the compensation component 420 and another component, etc.).

In one embodiment, the first edition of the signal of interest functions as a base signal. The second edition of the signal of interest can be modified such that it aligns with the base signal. In one example, the echo signal offset (e.g., a difference between the second edition echo signal and the first edition echo signal) can be used to change the second edition of the signal of interest to align with the first edition of the signal of interest.

Figure 11:
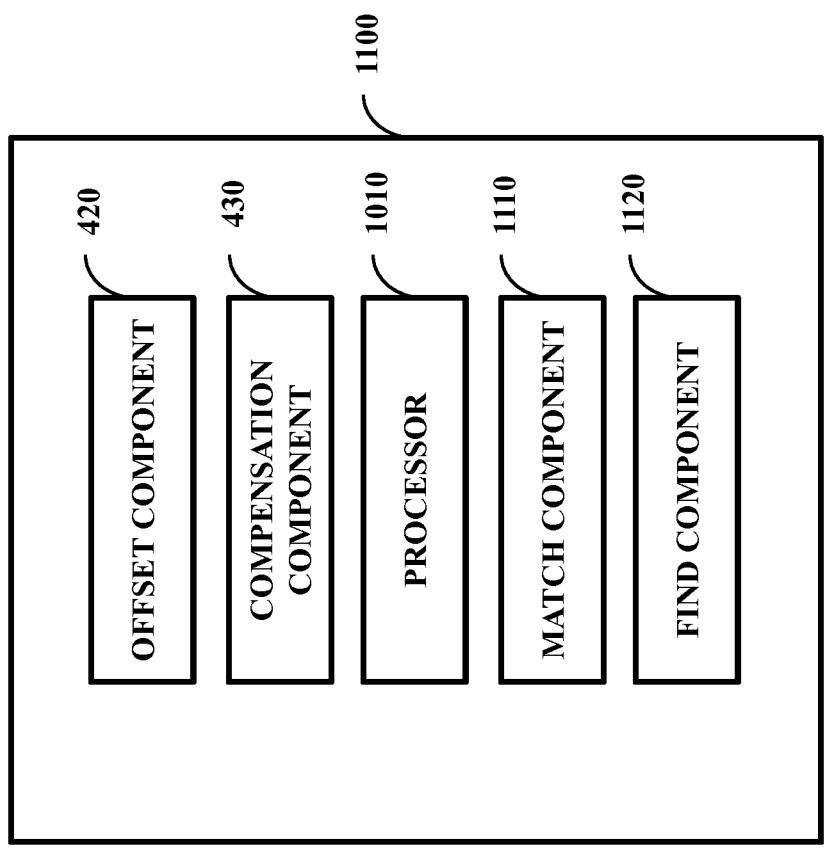
FIG. 11 illustrates one embodiment of a system comprising the offset component, the compensation component, the processor, a match component, and a find component.

FIG. 11 illustrates one embodiment of a system 1100 comprising the offset component 420, the compensation component 430, the processor 1010, a match component 1110, and a find component 1120. The match component 1110 matches the signal of interest with a known signal after the second edition of the signal of interest is compensated. The find component 1120 finds a known signal modulation scheme of the known signal, where the known signal modulation scheme is used to demodulate the signal of interest. In one embodiment, the match component 1110 is configured to match a constellation of the signal of interest with a constellation of the known signal.

In one embodiment, the system 1100 can have access to a database of known signals (e.g., signal constellations with an associated modulation scheme). Once the editions of the signal of interest are aligned, a constellation of the signal of interest can be determined (e.g., after fusing together the editions of the signal of interest or before fusing together the editions of the signal of interest) and compared against constellations of known signals in the database. When a match is found (e.g., a highest match, a highest match that reaches a threshold, etc.), a modulation scheme of the matching signal can be designated as the modulation scheme for the signal of interest (e.g., if the network of the signal of interest is not know, then the modulation scheme of the signal of interest is also not known and thus a modulation scheme is designated to demodulate the signal of interest).

Figure 12:
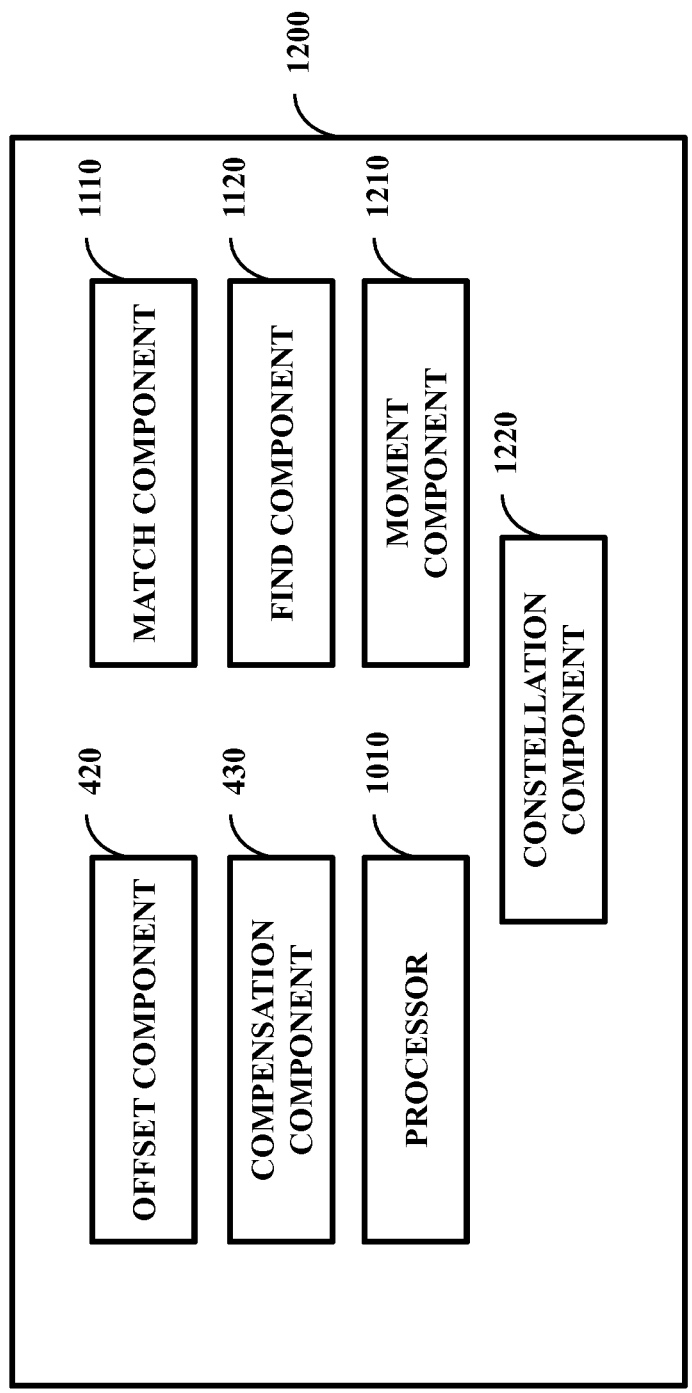
FIG. 12 illustrates one embodiment of a system comprising the offset component, the compensation component, the processor, the match component, the find component, a moment component, and a constellation component.

FIG. 12 illustrates one embodiment of a system 1200 comprising the offset component 420, the compensation component 430, the processor 1010, the match component 1110, the find component 1120, a moment component 1210, and a constellation component 1220. The moment component 1210 calculates a moment through use of the first edition of the signal of interest and the second edition of the signal of interest, where the moment takes a summation of a product produced from multiplying the first edition of the signal of interest with the second edition of the signal of interest, The constellation component 1220 identifies the constellation of the signal of interest through use of the moment.

Figure 13:
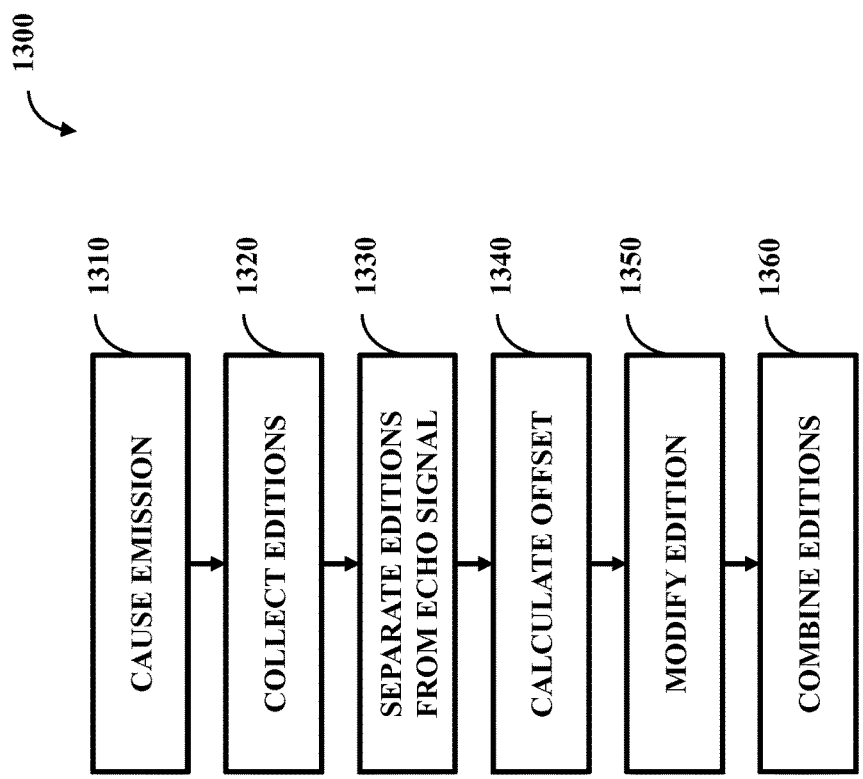
FIG. 13 illustrates one embodiment of a method comprising various actions.

FIG. 13 illustrates one embodiment of a method 1300 comprising various actions 1310-1360. At 1310, causing an emission of an echo signal to a first sensor and causing an emission of the echo signal to a second sensor occurs, where the first sensor and the second sensor are different sensors. At 1320, collecting a first edition of an echo signal with a first edition of a signal of interest from the first sensor occurs, where a network of the signal of interest is unknown. Also at 1320, collecting a second edition of the echo signal with a second edition of the signal of interest from the second sensor occurs, where a network of the signal of interest is unknown, where the first edition of the signal of interest and the second edition of the signal of interest are not identical. At 1330, separating the first edition of the echo signal from the first edition of the signal of interest occurs along with separating the second edition of the echo signal from the second edition of the signal of interest occurs. At 1340, calculating an offset of the first edition of the echo signal against the second edition of the echo signal takes place. At 1350, modifying the second edition of the signal of interest through use of the offset to produce a modified second edition of the signal of interest takes place. At 1360, combining the first edition of the signal of interest (e.g., original first edition of the signal of interest or a modified first edition of the signal of interest) and the modified second edition of the signal of interest to produce a combined signal of the signal of interest occurs.

Figure 14:
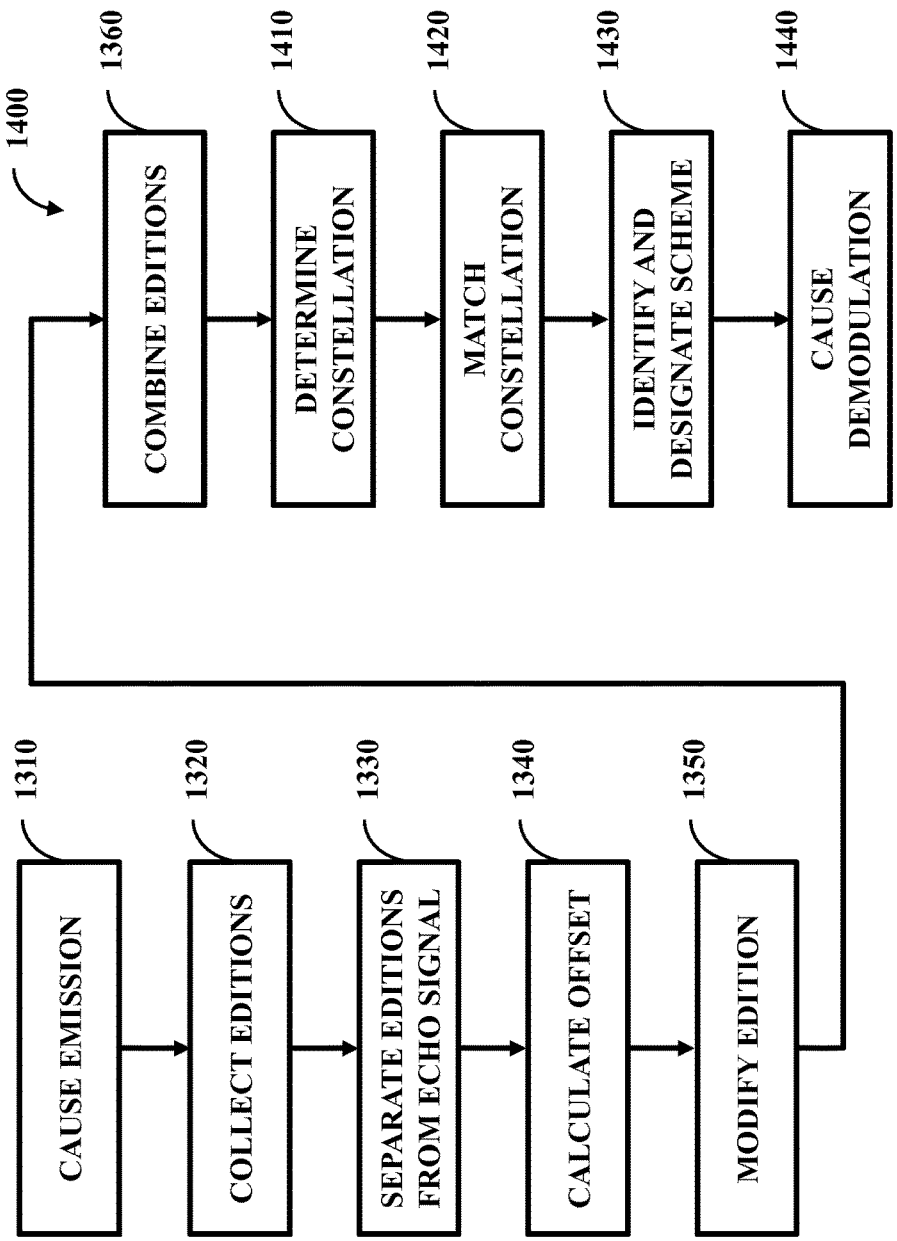
FIG. 14 illustrates one embodiment of a method comprising other actions in addition to the various actions.

FIG. 14 illustrates one embodiment of a method 1400 comprising other actions 1410-1440 in addition to the various actions 1310-1360. At 1410, determining a constellation of the combined signal of the signal of interest occurs. At 1420, matching the constellation of the combined signal of the signal of interest with a constellation of a known signal occurs. At 1430, identifying a modulation scheme of the known signal along with designating the modulation scheme of the known signal as the modulation scheme of the combined signal of the signal of interest takes place. At 1440, causing the combined signal of the signal of interest to be demodulated through use of the modulation scheme of the combined signal of the signal of interest occurs.

In one embodiment, calculating the offset of the first edition of the echo signal against the second edition of the echo signal comprises using a fast Fourier transform. In one embodiment, the first sensor is part of a first electronic device with a primary purpose other than functioning as a sensor of the first edition of the signal of interest and the second sensor is part of a second electronic device with a primary purpose other than functioning as a sensor of the second edition of the signal of interest, where the first electronic device and the second device are different electronic devices.

In one embodiment, the computer-readable medium 230 of FIG. 2 can be configured to store computer-executable instructions that when executed by the processor 1010 of FIG. 10 can cause the processor 1010 of FIG. 10 to perform the method 1300 of FIG. 13 and/or the method 1400. One of ordinary skill in the art will appreciate that the systems disclosed herein do not necessarily need to include the computer-readable medium 230 of FIG. 2 and/or the processor 1010 of FIG. 10. One of ordinary skill in the art will further appreciate that the computer-readable medium 230 of FIG. 2 and the processor 1010 of FIG. 10 can function as their own system. One of ordinary skill in the art will also appreciate that actions of methods described herein may be broken out into multiple actions and/or multiple actions may be combined into a single or simultaneous action. For example, the action 1320 can be separated into two separate actions of collecting a first edition and a second edition. In one embodiment, components and other elements described herein can be part of a processing center (e.g., fusion center) and/or be retained in a housing.

What is claimed is:

1. A system, comprising:
    an emission component configured to cause an emission of an echo signal to a first sensor and a second sensor;
    a collection component configured to collect a first edition of the echo signal with a first edition of a signal of interest from the first sensor and configured to collect a second edition of the echo signal with a second edition of the signal of interest from the second sensor; and a non-transitory computer-readable medium configured to retain at least one instruction associated with the emission component or the collection component, where the first sensor and the second sensor are different sensors where the first edition of the echo signal, the first edition of the signal of interest, the second edition of the echo signal, and the second edition of the signal of interest are used to detect the signal of interest and select a demodulation scheme for the signal of interest and where the emission component, the collection component, and the non-transitory computer-readable medium are retained in a fusion center that does not function as a sensor.

2. The system of claim 1, comprising:
a splitter component configured to separate the first edition of the echo signal from the first edition of the signal of interest and configured to separate the second edition of the echo signal from the second edition of the signal of interest;
an offset component configured to perform a calculation of an echo signal offset, where the echo signal offset is calculated through use of the first edition of the echo signal and the second edition of the echo signal; and
a compensation component configured to perform a compensation for an offset of the first edition of the signal of interest against the second edition of signal of interest through use of the echo signal offset.

3. The system of claim 2, comprising:
a calculation component configured to perform a mathematical operation upon the first edition of the signal of interest after compensation and upon the second edition of the signal of interest after compensation to produce a mathematical result, and
a determination component configured to make a determination on a modulation scheme for the signal of interest based, at least in part, on the mathematical result, where the modulation scheme is employed to demodulate the signal of interest.

4. The system of claim 3, comprising:
a demodulation component configured to demodulate the signal of interest through employment of the modulation scheme; and
an output component configured to cause the signal of interest to be outputted after being demodulated.

5. The system of claim 2, where the calculation of the echo signal offset comprises calculation of a relative frequency offset.

6. The system of claim 5, where the calculation of the echo signal offset comprises calculation of a relative phase offset.

7. The system of claim 2, comprising:
a fusion component configured to produce a combined signal through combination of the first edition of the signal of interest with the second edition of the signal of interest after the first edition of the signal of interest is separated from the first edition of the echo signal and after the second edition of the signal of interest is separated from the second edition of the echo signal, where the combined signal is configured for use in signal sensing, classification, and localization.

8. The system of claim 2, where the compensation comprises modifying the second edition of the signal of interest in accordance with the echo signal offset while the first edition of the signal of interest is unmodified in accordance with the echo signal offset.

9. The system of claim 1, comprising:
a splitter component configured to separate the first edition of the echo signal from the first edition of the signal of interest and configured to separate the second edition of the echo signal from the second edition of the signal of interest;
an sample component configured to determine a sample status of the first edition of the signal of interest after the first edition of the signal of interest is separated from the first edition of the echo signal and configured to determine a sample status of the second edition of the signal of interest after the second edition of the signal of interest is separated from the second edition of the echo signal;
an comparison component configured to make a threshold determination if the sample status of the first edition of the signal of interest is consistent with the second edition of the signal;
a re-sample component configured to re-sample the second edition of the signal of interest to a rate of the first edition of the signal of interest if the threshold determination is that the sample status of the second edition of the signal of interest is not at the same rate as the first edition of the signal of interest, where the re-sampled second edition of the signal of interest is lined up in time with the first edition of the signal of interest;
a fusion component configured to produce a combined signal through combination of the first edition of the signal of interest with the re-sampled second edition of the signal of interest, and
a determination component configured to make a determination on a modulation scheme for the signal of interest based, at least in part, on the combined signal.

10. The system of claim 1,
where the first sensor is part of a first electronic device with a primary purpose other than functioning as a sensor of the first edition of the signal of interest and
where the second sensor is part of a second electronic device with a primary purpose other than functioning as a sensor of the second edition of the signal of interest, where the first electronic device and the second device are different electronic devices.

11. The system of claim 1,
where the emission component is configured to cause emission of the echo signal with a signal of interest request signal to the first sensor, where the emission component is configured to cause emission of the echo signal with the signal of interest request signal to the second sensor,
where the first sensor sends the first edition of the echo signal with the first edition of a signal of interest that is collected by the collection component in response to the signal of interest request signal, and
where the second sensor sends the second edition of the echo signal with the second edition of a signal of interest that is collected by the collection component in response to the signal of interest request signal.

12. A method, comprising:
causing, by way of a fusion center that does not function as a sensor, an emission of an echo signal to a first sensor;
causing, by way of the fusion center, an emission of the echo signal to a second sensor that is different from the first sensor;
collecting, by way of the fusion center, a first edition of the echo signal with a first edition of a signal of interest from the first sensor; and collecting, by way of the fusion center, a second edition of the echo signal with a second edition of the signal of interest from the second sensor, where the first edition of the echo signal, the first edition of the signal of interest, the second edition of the echo signal, and the second edition of the signal of interest are employed to detect the signal of interest and select a demodulation scheme for the signal of interest.

13. The method of claim 12, comprising:

detecting the signal of interest through employment of the first edition of the echo signal, the first edition of the signal of interest, the second edition of the echo signal, and the second edition of the signal of interest; and selecting a demodulation scheme for the signal of interest through employment of the first edition of the echo signal, the first edition of the signal of interest, the second edition of the echo signal, and the second edition of the signal of interest.

14. The method of claim 13, comprising:

demodulating the signal of interest in accordance with the demodulation scheme; and outputting the demodulated signal of interest.

15. The method of claim 12, comprising:

separating the first edition of the echo signal from the first edition of the signal of interest;

separating the second edition of the echo signal from the second edition of the signal of interest;

calculating an echo signal offset through use of the first edition of the echo signal and the second edition of the echo signal; and performing a compensation for an offset of the first edition of the signal of interest against the second edition of signal of interest through use of the echo signal offset.

16. The method of claim 15, where the calculating of the echo signal offset comprises calculating a relative frequency offset and where the calculating of the echo signal offset comprises calculating a relative phase offset.

17. A system, comprising:

an emission component configured to cause an emission of an echo signal to a first sensor and cause an emission of the echo signal to a second sensor that is different from the first sensor;

a collection component configured to collect a first edition of the echo signal with a first edition of a signal of interest from the first sensor and collect a second edition of the echo signal with a second edition of the signal of interest from the second sensor; and a processor configured to execute at least one instruction associated with operation of the emission component or the collection component, where the first edition of the echo signal, the first edition of the signal of interest, the second edition of the echo signal, and the second edition of the signal of interest are employed to detect the signal of interest and select a demodulation scheme for the signal of interest, where the emission component the collection, component, and the processor are retained in a fusion center that does not function as a sensor.

18. The system of claim 17, comprising:

a detection component configured to detect the signal of interest through employment of the first edition of the echo signal, the first edition of the signal of interest, the second edition of the echo signal, and the second edition of the signal of interest; and a selection component configured to select a demodulation scheme for the signal of interest through employment of the first edition of the echo signal, the first edition of the signal of interest, the second edition of the echo signal, and the second edition of the signal of interest.

19. The system of claim 18, comprising:

a demodulation component configured to demodulate the signal of interest in accordance with the demodulation scheme; and an output component configured to output the demodulated signal of interest.

20. The system of claim 17, comprising:

a separation component configured to separate the first edition of the echo signal from the first edition of the signal of interest and configured to separate the second edition of the echo signal from the second edition of the signal of interest;

a calculation component configured to calculate an echo signal offset through use of the first edition of the echo signal and the second edition of the echo signal; and a compensation component configured to perform a compensation for an offset of the first edition of the signal of interest against the second edition of signal of interest through use of the echo signal offset.

* * * * *